(12) United States Patent  
Golden (10) Patent No.: US 9,146,105 B2  
(45) Date of Patent: Sep. 29, 2015

(54) SYSTEM AND METHOD FOR ACCURACY CERTIFICATION OF GEOGRAPHICAL LOCATIONS ON A LAND TRACT

(71) Applicant: WolfGIS, LLC, Pell City, AL (US)

(72) Inventor: John Michael Golden, Pell City, AL (US)

(73) Assignee: Wolf-Tek, LLC, Pell City, AL (US)

( * ) Notice: Subject to any disclaimer, the term of this patent is extended or adjusted under 35 U.S.C. 154(b) by 139 days.

(21) Appl. No.: 14/142,316

(22) Filed: Dec. 27, 2013

(65) Prior Publication Data

US 2014/0187273 A1 Jul. 3, 2014

Related U.S. Application Data

(60) Provisional application No. 61/746,542, filed on Dec. 27, 2012.

(51) Int. Cl.  
*H04W 24/00* (2009.01)  
*G01C 15/00* (2006.01)  
*G01S 19/42* (2010.01)

(52) U.S. Cl.  
CPC .............. *G01C 15/00* (2013.01); *G01S 19/42* (2013.01)

(58) Field of Classification Search  
USPC ........................................ 455/456.6  
See application file for complete search history.

(56) References Cited

U.S. PATENT DOCUMENTS

| 5,375,059 | A | 12/1994 | Kyrtsos et al. |
| 5,438,517 | A | 8/1995 | Sennott et al. |
| 5,490,073 | A | 2/1996 | Kyrtsos |
| 5,995,902 | A * | 11/1999 | Monson ........................ 701/468 |
| 8,378,815 | B1 | 2/2013 | Jones et al. |
| 2003/0090415 | A1 | 5/2003 | Miyasaka et al. |
| 2005/0021284 | A1 | 1/2005 | Gaal |
| 2006/0135180 | A1 | 6/2006 | Jakel et al. |
| 2007/0118739 | A1 | 5/2007 | Togashi et al. |
| 2009/0100260 | A1 | 4/2009 | Govindarajan |
| 2009/0278839 | A1 | 11/2009 | Geis et al. |
| 2010/0141523 | A1 | 6/2010 | Riley et al. |
| 2010/0293193 | A1 | 11/2010 | Harrison et al. |
| 2012/0023333 | A1 | 1/2012 | Takada et al. |
| 2012/0146847 | A1 | 6/2012 | Janky et al. |
| 2013/0174076 | A1 | 7/2013 | Geelen |

FOREIGN PATENT DOCUMENTS

EP 1431848 A2 6/2004

* cited by examiner

*Primary Examiner* — Joel Ajayi  
(74) *Attorney, Agent, or Firm* — Butler Snow LLP (57) ABSTRACT

The current invention is a system and method for certifying GPS locations on a land tract using consumer devices having standard GPS chipsets. The system takes a plurality of readings from at least four satellites into one or more sample sets. A smoothing function is used to remove outlier GPS values and a circular plot of spatial positions made. A center location of the plot is then calculated and recorded. The process is repeated and then compared to the first center calculation. If the difference is less than a predetermined certification value, the position can be certified as accurate. Various features in a land tract can be certified to the predetermined accuracy. For example, using the process to certify or correct errors in a shapefile representing the land tract, physical markers placed on the land tract, or environmental features of a land tract to lessen environmental impact during development.

23 Claims, 6 Drawing Sheets

SYSTEM AND METHOD FOR ACCURACY CERTIFICATION OF GEOGRAPHICAL LOCATIONS ON A LAND TRACT

CROSS-REFERENCES TO RELATED APPLICATIONS

This application claims the benefit of U.S. Provisional Application No. 61/746,542, filed Dec. 27, 2012, which is incorporated herein by reference in its entirety.

FIELD

The present invention relates generally to GPS location services on a handheld device. In greater particularity, the present invention relates to the certification of GPS based coordinates using on a handheld device.

BACKGROUND

The surveying industry has been moving for at least a decade away from optically based survey reconnaissance to GPS based location verification and marking. The modern surveyor uses a handheld or tripod mounted device that includes an advanced GPS chipset, enabling such surveying devices to communicate with the GPS constellation of satellites and know its GPS location within approximately a few meters.

More recently, non-specialized consumer devices, such as cell phones and tablet computing devices, include GPS chipsets and use their own application software to receive GPS satellite messages, which enable the device to calculate its GPS location. As is known, a GPS enabled device has a receiver that uses messages received from GPS satellites to determine each satellite's position and the time the message was sent. What is received is the x, y, and z components of the satellite's position and the time sent by the satellite, which are designated as $[x_i, y_i, z_i, t_i]$ where the subscript i denotes the satellite and has the value 1, 2, ..., n, and where n is greater than 4. Four satellite messages is the minimum number that a reasonable GPS based location may be obtained by a consumer device. When the time of message reception indicated by the on-board clock of the GPS enabled device is $t_r$, the true reception time is $t_r+b$ where b is receiver's clock bias (i.e., clock delay). The message's transit time is $t_r+b+t_i$. Assuming the message traveled at the speed of light, c, the distance traveled is $(t_r+b+t_i)c$. Knowing the distance from receiver to satellite and the satellite's position implies that the receiver is on the surface of a sphere centered at the satellite's position and with the radius being the distance traveled. Thus the receiver is at or near the intersection of the surfaces of the spheres if it receives signals from more than one satellite. In the ideal case of zero errors, the receiver is at the intersection of the surfaces of these spheres.

The clock error or bias, b, is the amount that the receiver's clock is off. The receiver has four unknowns, the three components of GPS receiver position and the clock bias [x, y, z, b]. The equations of the sphere surfaces are given by:

$$(x-x_i)^2+(y-y_i)^2+(z-z_i)^2+=([t_r+b+t_i]c)^2, \ i=1, 2, \ldots, n$$

or in terms of pseudoranges, $p_i=(t_r+t_i)c$, as $$p_i=\sqrt{(x-xi)^2+(y-yi)^2+(z-zi)^2}-bc, \ i=1, 2, \ldots, n.$$

The pseudoranges can then be solved to yield the GPS coordinates of the device. Using modern semiconductor processors, consumer devices can produce a series of GPS coordinates every second, from a plurality of satellite messages.

However, GPS based consumer devices lack sufficient precision to support serious surveying work on tracts of land. For example, the best consumer devices provide precision down to about 6 meters, but that precision is typically not maintained over relatively small sampling periods, resulting in variances of up to 30 meters. Such precision levels do not support services to survey or confirm land tract boundaries.

What is needed is a process and method for providing sufficient accuracy on handheld consumer devices that utilize standard low cost commercial GPS receivers, and preferably to provide consistent location accuracy to within one (1) meter or less.

SUMMARY OF THE INVENTION

The current invention is a system and method for certifying GPS locations on a land tract using simple existing or available consumer devices having standard GPS chipsets. The system takes a plurality of readings from at least 4 satellites into one or more sample sets. A smoothing function is then used to remove outlier GPS pseudorange values and a circular plot of spatial positions made. A center location of the plot is then calculated and recorded. The process is repeated for another center calculation and then compared to the first center calculation, if the difference is less than a predetermined certification value, such as, for example, one (1) meter, the position can be certified as accurate. Utilizing this GPS location sampling method, various features in a land tract can be certified to the predetermined accuracy.

BRIEF DESCRIPTION OF THE DRAWINGS

Further advantages of the invention will become apparent by reference to the detailed description of preferred embodiments when considered in conjunction with the drawings which form a portion of the disclosure and wherein.

DESCRIPTION OF EMBODIMENTS

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
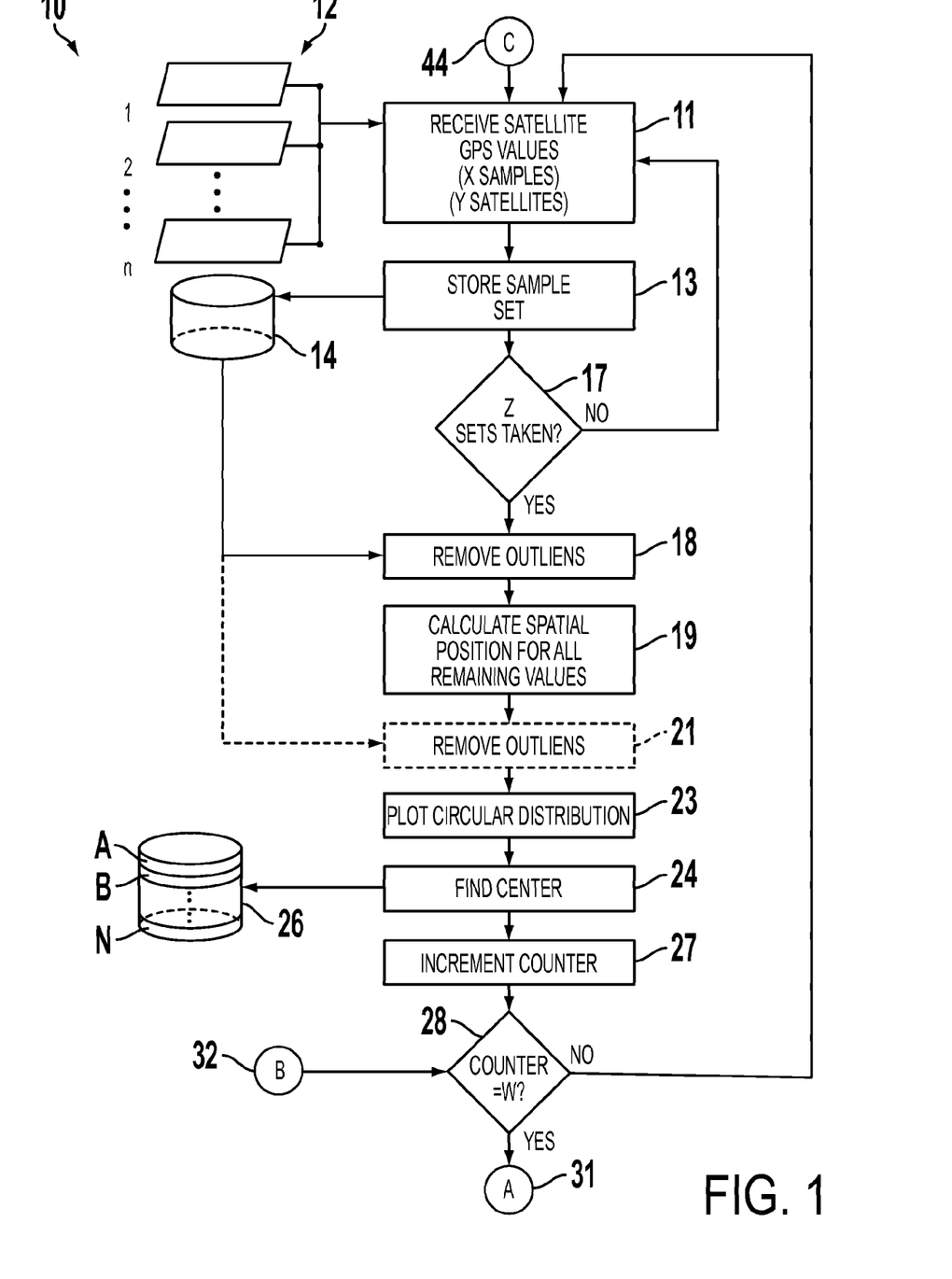
FIG. 1 is a flow diagram showing the steps in calculating a reliable geographical location.

Referring to the drawings for a better understanding of the function and structure of the invention, FIG. 1 presents the basic sub-process (means) 10 for finding and recording a statistically accurate center location position. The processes described herein are anticipated to be run on a handheld device (a portable electronic computing device) such as a tablet computing device, smart cellular phone, laptop computer, or similar device comprising an output means (such as a display), an input means (such as touch screen or keyboard), a memory means (such as hard drive, flash media, volatile memory, or other memory device), supportive communication capabilities for communicating over the Internet (such as WiFi, cellular, or wired communication capabilities known in the art), and a processor having relatively sophisticated processing power. The processor in such devices will be in electrical communication with the memory, input/output means, and other hardware and software aspects of the devices. Devices such an iPhone™ or iPad™ made by Apple Computer or an Android® based OS mobile computing device are examples of such devices having the above characteristics, including relatively sophisticated processing power and supportive communication capabilities. Most of these devices utilize standard consumer GPS chipsets that include GPS receivers that can collect data from GPS satellites meeting the requirements of the herein disclosed processes. The GPS chipsets, including the GPS receivers, in these devices are also in electrical communication with its processor.

As shown in process 10, the GPS receiver receives a plurality of GPS message values 11 from a plurality of satellites 12, namely satellite samples "x" of the form $[x_i, y_i, z_i, t_i]$ as discussed above, from a plurality of satellites "y" at a specified sampling rate over a specified sampling period. In the preferred embodiment, the sampling rate is at least 50 samples (x) from at least 4 satellites sampled continuously, and at a sampling period of three (3) minutes. Hence, a minimum sampling set of 150 satellite locations taken at a specified time value, from each satellite, which yields 600 values in a sample set "z". That sample set is stored 13, and the steps 11-13 repeated to acquire additional sample sets as desired 17. In the preferred embodiment only one sample set is taken and stored to reduce processing overhead in the handheld device incorporating the herein described processes, but the process can utilize additional sample sets to improve the accuracy of the process 10 in some embodiments. The sample set is then analyzed using software installed on the device utilizing the processor and outlier values are removed 18. Outliers are removed pursuant to standard statistical deviation techniques so that unreliable sample values are discarded from spatial position calculations. A spatial position for the receiver based upon the remaining values in the sample set is then calculated 19 for each four parallel satellite position values. An additional step of outlier removal is optionally applied 21 to further improve accuracy. Hence, a receiver position set is produced providing a maximum of 150 calculated receiver positions in (x, y, z) GPS coordinate values.

Once a sample set of receiver positions is calculated, a circular distribution of those values is plotted 23, and a center value is calculated 24 by averaging the location values with known position techniques in software installed on the device utilizing the processor. The software utilizes the algorithm of process 10 depicted in FIG. 1 and processor to calculate and determine the center location position(s). Further limitations on what values will be averaged from the sample set of receiver positions may be made, such as excluding some positions that are outside of a calculated circular error perimeter. Each center value is found in this manner and then saved in memory 26 and a counter is incremented 27. The process 10 is then repeated if a counter value "w" has not been reached 28. For each center value calculated in process 10, those values are retained in memory 26 and utilized in process 30 as will be described. In the preferred embodiment, only two center values are needed to be able to "certify" a GPS location to within one (1) meter accuracy.

Figure 2:
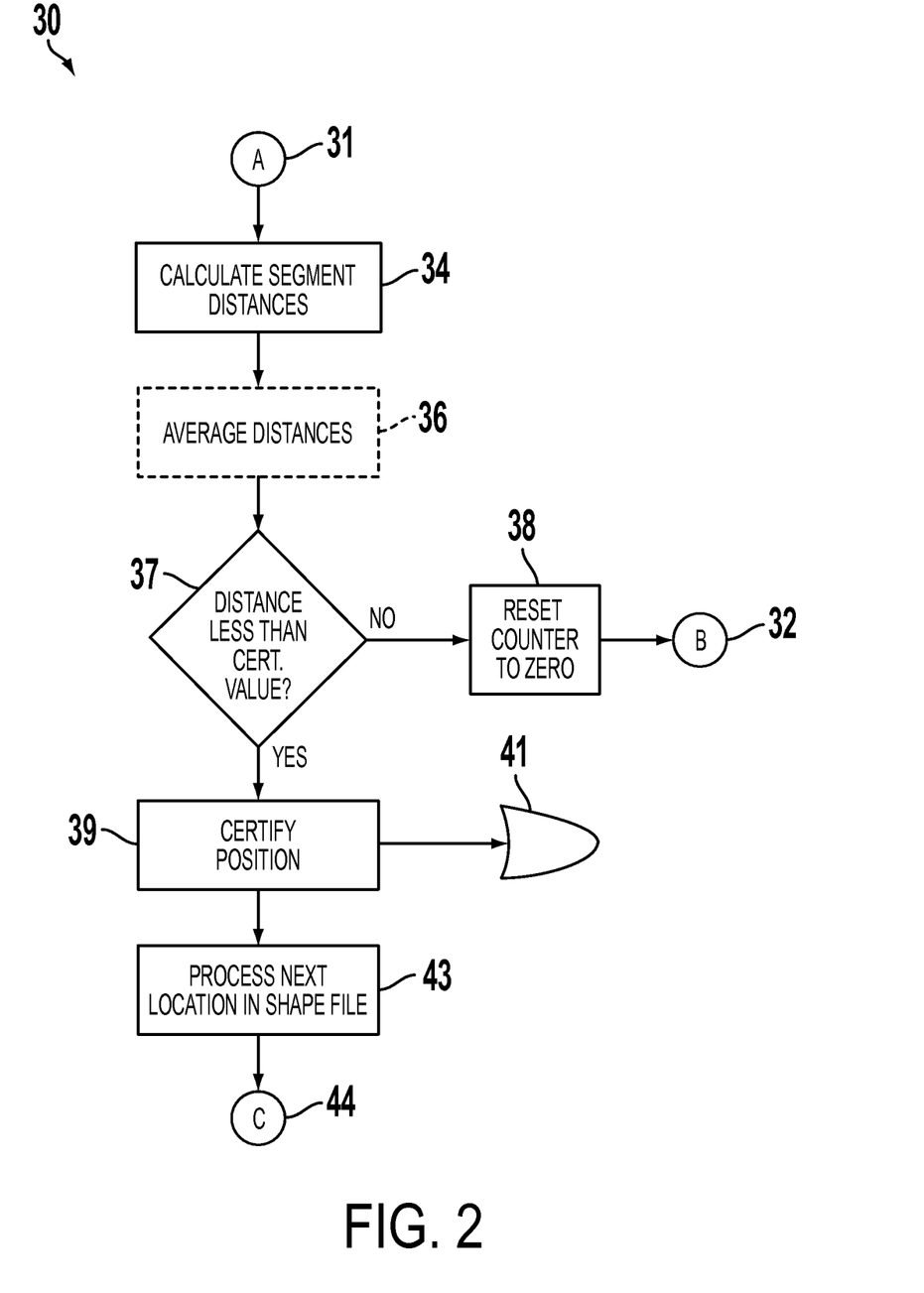
FIG. 2 is a processing top level flow diagram showing the geographical location certification process based upon locations calculated in process of FIG. 1.

Once one or more center position values have been calculated and saved, a process for averaging the center locations may be done to certify 30 the location on the handheld device. The values saved in memory 26 are retrieved and the distances between each segment calculated 34. Those values are then averaged 36 to determine the average distance for each segment between each position. If the averaged distance is less than a predetermined certification value (e.g. 1 meter) 37, the device can certify the current position and provide a position value to record. The position value may be a selected center value position, such as the first received value, or it may be a center calculated position by plotting a central point again as in steps 23 and 24. Or, it may simply be the location at a mid-distance between two calculated center points. For example, in the preferred embodiment in which only two values are calculated from process 10, a final position may be obtained by simply calculating the segment distances and selecting either one, if the distance is less than one (1) meter between each. This obviates the necessity of step 36. Alternatively, the midpoint between the two center values may be calculated and selected as the certified location. For the purposes of surveying, an average distance less than one (1) meter is sufficient precision to certify a location.

As will be appreciated from the figures, if the certification value is satisfied 37, a selected position is certified 39 and a notification provided to the user of the device 41. The next location may then be certified as will be shown in the examples of FIGS. 3-6 by simply returning C 44 to process 10. In the event that the certification value is not satisfied 37, the counter is reset to zero 38 and another sample set calculation is initiated B 32. As may be understood, the sample size x, number of satellites y, the number of sample sets z, and counter value w may be varied to suit each application to which a device running the processes 10 and 30 may be suited.

Figure 3:
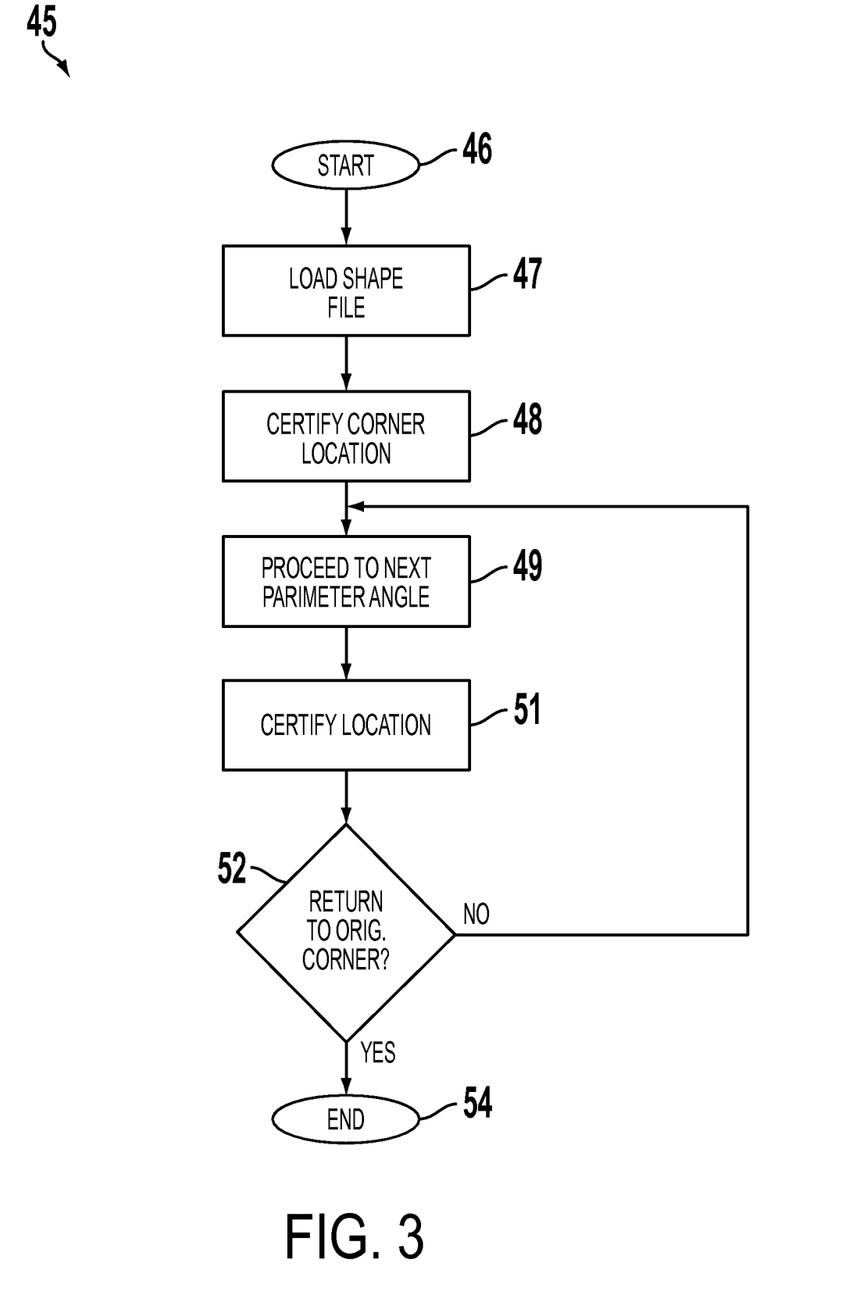
FIG. 3 is a process for certifying the geographical perimeter of a land tract using a shapefile.

Turning now to FIG. 3, it may be seen that the processes in 10 and 30 may be combined to certify the perimeter of a land tract, thereby providing a high degree of accuracy in working on or around the land tract boundary. Initially, an Esri (or "ESRI") shapefile 47 is loaded into the mobile device. The Esri shapefile format is a popular geospatial file format utilizing vector data to represent geographic information. Esri shapefiles have an open format and are anticipated to be utilized for some time. For the purposes of this disclosure the term "shapefile" shall generally refer to the Esri type shapefile format, but the inventor fully envisions that additional and evolved forms of geographic shapefiles may be utilized with the herein disclosed processes. After loading, a user of the certification device moves to a known corner of the land tract and certifies the location 48 pursuant to the process 30 in FIG. 2. The user then moves to the next substantive angle in the perimeter 49 and certifies that location 51. The user continues certifying angles along the land tract perimeter until returning to the original corner that was certified 52, which ends 54 the certification process. The certified corner perimeter locations (boundary) in the shapefile can then uploaded to a remote database on a remote server immediately or upon accessing a network communication link.

Figure 4:
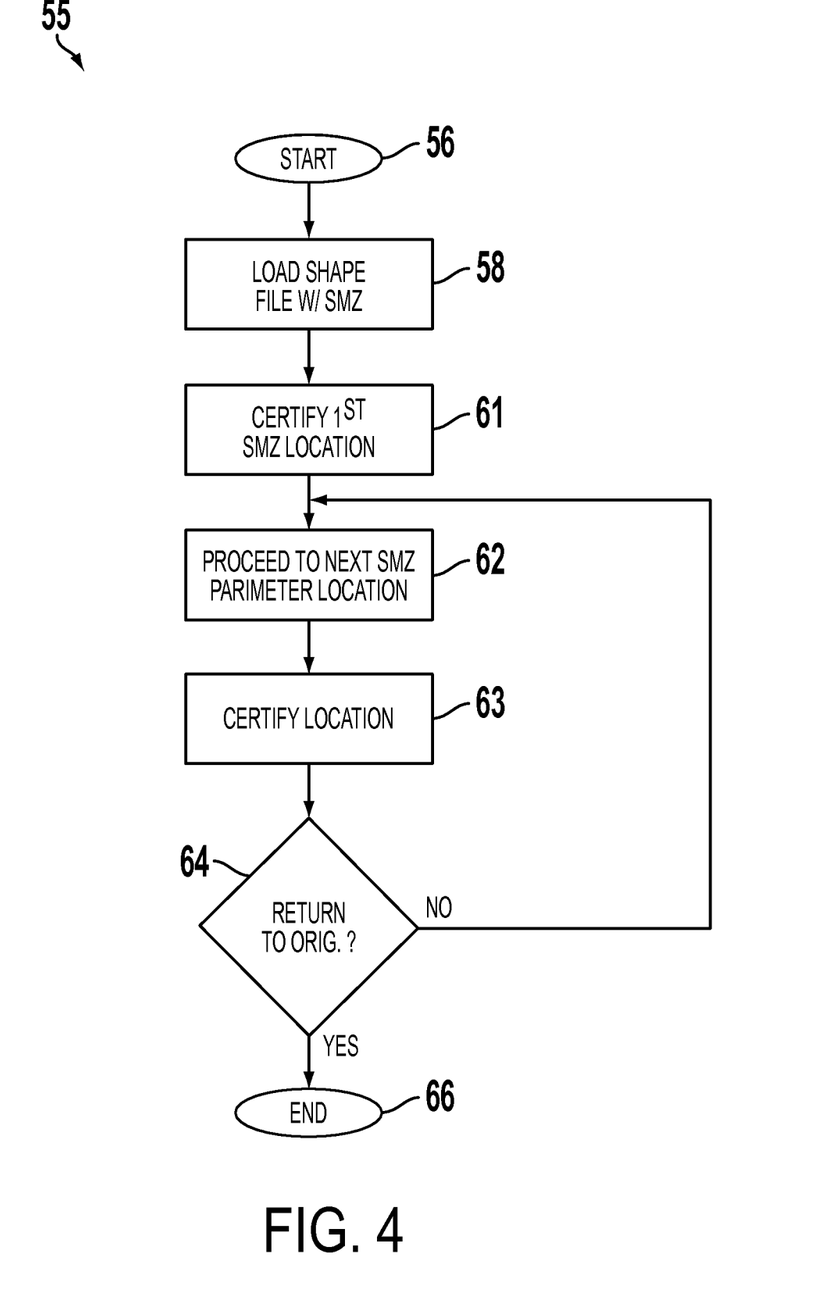
FIG. 4 is a process for certifying the geographical perimeter of an SMZ perimeter.
Figure 5:
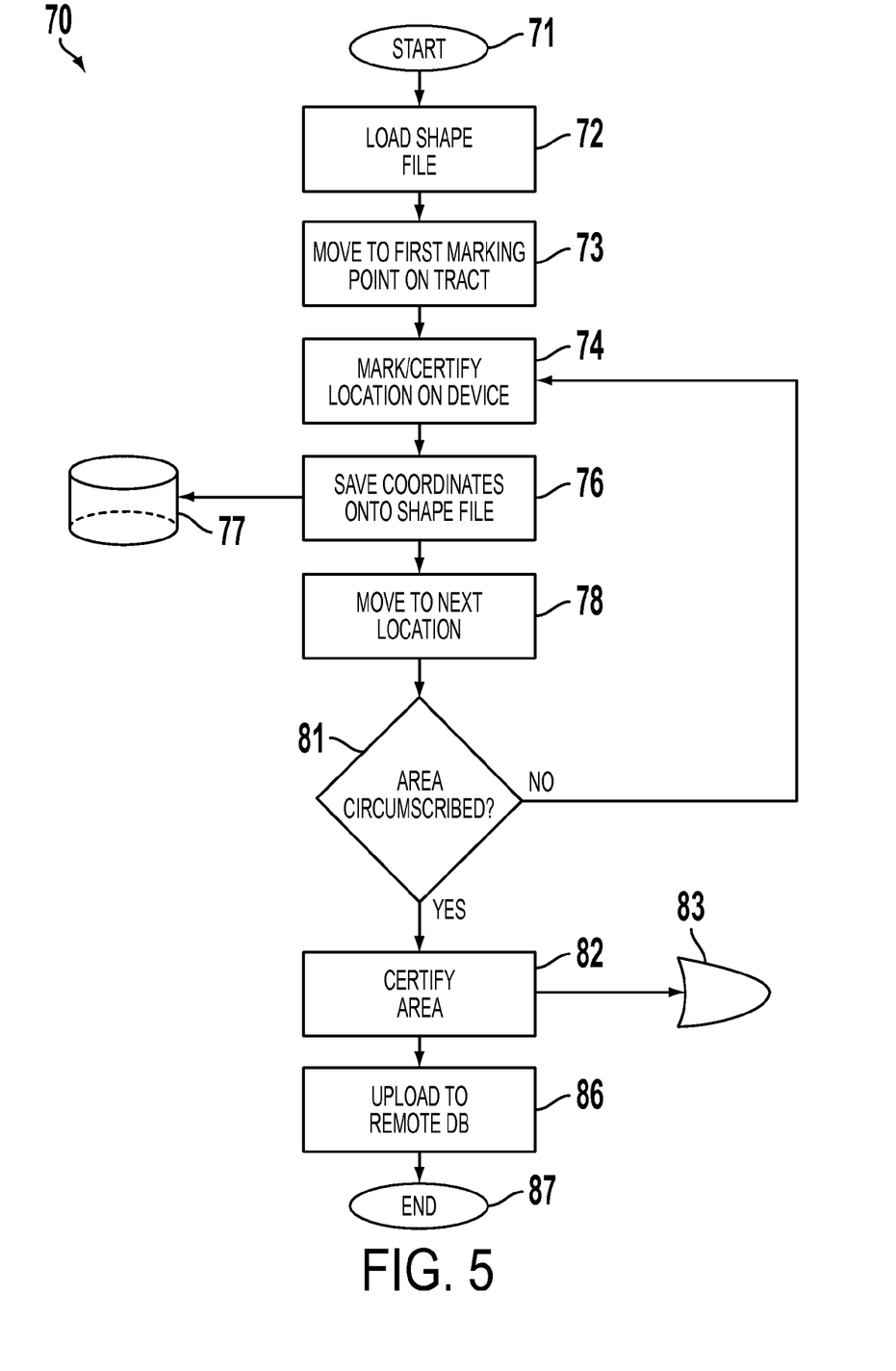
FIG. 5 is a process for certifying physical perimeter points in a land tract onto a shapefile representing the land tract.

The user can also proceed to certify recorded internal environmental aspects in the land tract using the same system. For example, as shown in FIG. 4, process 55 can be used to certify a streamside management zone ("SMZ"), such as a wetland area, to ensure environmental control of the SMZ areas in a tract development. A shapefile holding SMZ location information is loaded 58 and a first location point certified 61. A next adjacent SMZ perimeter location point is then certified 62-63 until all perimeter locations are certified 64. In this manner, a proper and accurate boundary may be recorded and/or updated with good accuracy with little effort. The certified SMZ perimeter locations in the shapefile can then uploaded to a remote database on a remote server immediately or upon accessing a network communication link.

Similarly, "offsets" may be encountered either from topological maps or shapefiles having marked features. Process 70 in FIG. 5 allows for certification of existing locations found in shapefiles or on topological maps, and the recordation and uploading of those values to a remote database of errors or "offsets" from prior recorded geographical information. In the process 70, a shapefile for the land tract is loaded 72 and a first marking point 73 is marked and certified 74. If the location is offset from an expected location, the offset location is saved onto the shapefile 76 and the process moves to the next location 78 until the desired area is circumscribed 81. The area can then be certified 82 and the offsets via the shapefile uploaded to a remote database on a remote server 86 immediately or upon accessing a network communication link.

Figure 6:
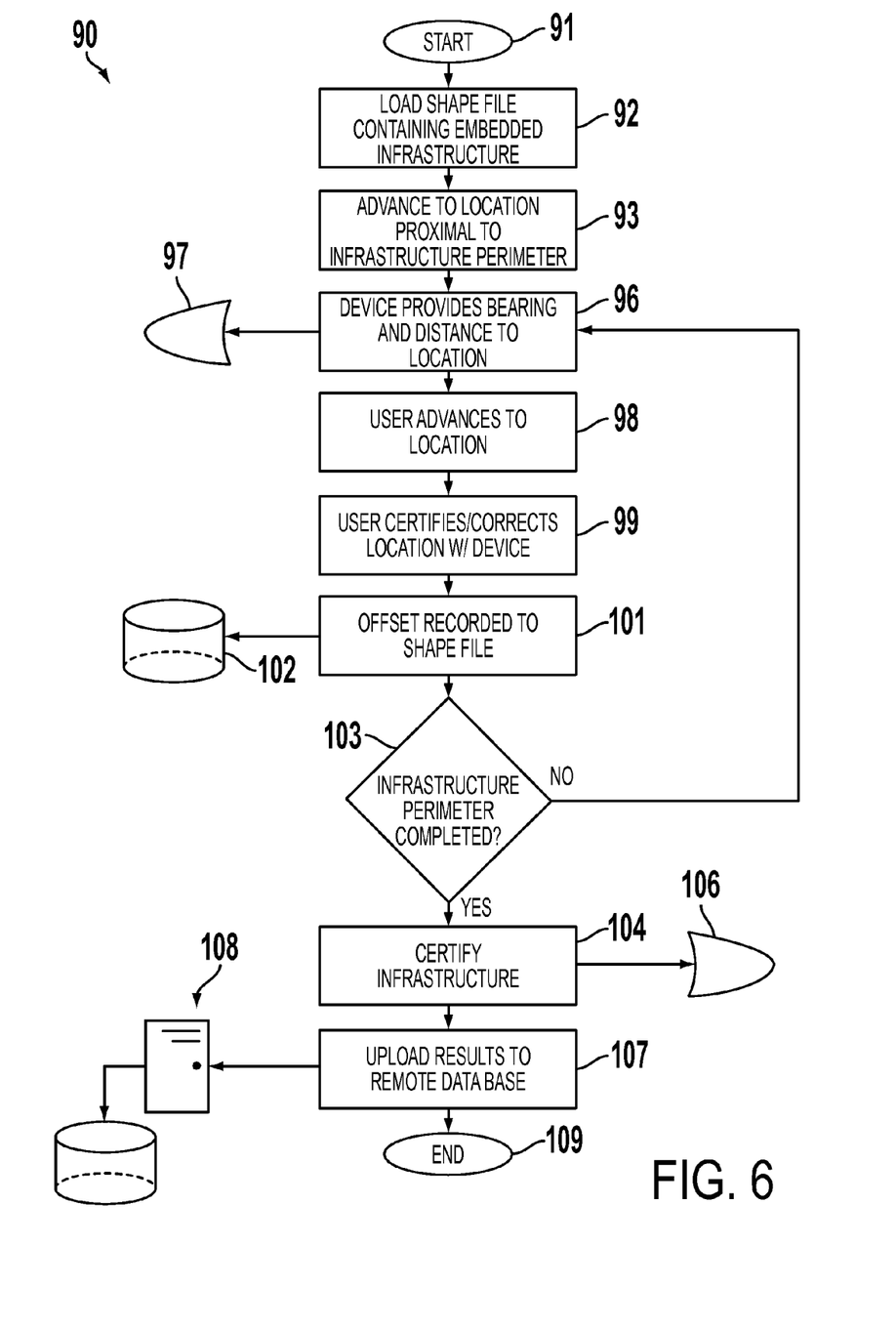
FIG. 6 is a process for certifying and correcting an infrastructure perimeter in a land tract or for correcting physical perimeter points in a land tract onto a shapefile representing the land tract.

Infrastructure features in or on at least a portion of a land tract can also be certified and/or corrected. As shown in FIG. 6, a shapefile having embedded infrastructure information is loaded 92 and a user may advance to an area proximal to the infrastructure perimeter 93. The device then provides a distance and bearing to the user to certify a first location 96. The user advances until the device indicates the user is at the desired infrastructure location 98. The location may already have physical markers planted in the ground to indicate the infrastructure location point, thereby allowing the user to visibly verify if the location is offset from an expected location point. The user alternatively can use his or her observation skills to confirm or correct the correlated infrastructure location point in the shapefile 99. Any offsets discovered are recorded and the user moves on to the next infrastructure location point as indicated on the screen 97 of the device. After the infrastructure perimeter is completed the infrastructure may be certified 104 and the results uploaded 107 to a remote database 108 on a remote server. As may be understood, the user can correct both internal and external errors for the infrastructure on the land tract.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A system for certifying a GPS location comprising a portable electronic computing device having a processor, a memory, and a GPS receiver in electrical communication with said processor; wherein said GPS receiver is configured to receive said data from at least four GPS satellites to create a first sample set of positions and a second sample set of positions, wherein each of said first and second sample sets of positions is stored in said memory; wherein said processor is configured to process said first and said second sample sets of positions to create a first center location position and a second center location position, respectively, for said device, and to process said first and said second center location positions to certify said GPS location, said GPS location is certified when said first and second center location positions are processed to determine an average distance for a plurality of segments between each of said positions stored in said memory and said average distance is less than a predetermined certification value.

2. The system of claim 1, wherein said portable electronic computing device is a smart cellular phone, tablet computer, or laptop computer.

3. The system of claim 1, wherein said data is a plurality of message values from said at least four GPS satellites.

4. The system of claim 3, wherein said processor further processes said plurality of message values from said at least four GPS satellites to create GPS pseudoranges values.

5. The system of claim 4, wherein said processor further processes said GPS pseudoranges values to remove outlier GPS pseudoranges values.

6. The system of claim 1, wherein said device further comprises one or more communications means capable of communicating over the Internet via WiFi, cellular networks, or wired connections.

7. The system of claim 6, wherein said certified GPS location is recorded in a remote database in communication with said device over the Internet.

8. A system for certifying a GPS location on a land tract comprising a portable electronic computing device having a processor, a memory in electrical communication with said processor, a GPS receiver in electrical communication with said processor, a predetermined certification value stored in said memory, and means for determining at least two center location positions for said device and certifying said GPS location of said device, wherein said GPS location is certified when said at least two center location positions are processed to determine a distance between each of said at least two center location positions, said distance between each of said at least two center location positions is then averaged to determine an average distance between each position, and said average distance between each position is less than said predetermined certification value.

9. The system of claim 8, further comprising one or more communications means capable of communicating over the Internet via WiFi, cellular networks, or wired connections.

10. The system of claim 9, further comprising a remote database.

11. The system of claim 10, further comprising a remote server.

12. A method for certifying a GPS location on a land tract as accurate comprising the steps of:
 a. receiving a first plurality of message values from at least four GPS satellites during a first sampling period;
 b. creating a first sample set with said first plurality of message values;
 c. determining a first GPS pseudorange value for each message value in said first plurality of message values;
 d. determining a first center location from said first GPS pseudorange values;
 e. receiving a second plurality of message values from at least four GPS satellites during a second sampling period;
 f. creating a second sample set with said second plurality of message values;
 g. determining a second GPS pseudorange value for each message value in said second plurality of message values;
 h. determining a second center location from said second GPS pseudorange values; and
 i. certifying said GPS location on a land tract as accurate when an averaged distance between said first and said second center location is less than a predetermined certification value.

13. The method of claim 12, further comprising smoothing said first GPS pseudorange values and smoothing said second GPS pseudorange values.

14. The method of claim 13, wherein said steps of smoothing said first and said second GPS pseudorange values comprises removing outlier GPS pseudorange values and plotting spatial positions in a circular plot based on remaining said first and said second GPS pseudorange values.

15. The method of claim 12, wherein said step of certifying said GPS location on a land tract as accurate comprises comparing said first and said second center location.

16. The method of claim 12, wherein said predetermined certification value is one meter.

17. The method of claim 12, wherein said predetermined certification value is less than one meter.

18. The method of claim 12, further comprising the step of loading a geospatial file representing geographic information of said land tract.

19. The method of claim 18, wherein said GPS location on a land tract is a boundary of said land tract.

20. The method of claim 18, wherein said GPS location on a land tract is an infrastructure feature on at least a portion of said land tract.

21. The method of claim 18, wherein said GPS location on a land tract is an environmental aspect of said land tract.

22. The method of claim 12, wherein said averaged distance for said first and said second center location is determined by averaging each segment between each GPS pseudorange value of said first and said second center location.

23. The method of claim 12, wherein steps (a) through (d) are repeated at least a third time to determine at least a third center location prior to performing the certifying step.

* * * * *